Jan. 20, 1942. E. T. PUTNAM 2,270,556
APPARATUS FOR USE IN THE MANUFACTURE OF BUILDING BLOCKS
Original Filed June 11, 1937  6 Sheets-Sheet 1

Inventor
ERLE T. PUTNAM.
By Frank Fraser
Attorney

Inventor
ERLE T. PUTNAM.
By Frank Fraser
Attorney

Jan. 20, 1942.  E. T. PUTNAM  2,270,556
APPARATUS FOR USE IN THE MANUFACTURE OF BUILDING BLOCKS
Original Filed June 11, 1937   6 Sheets-Sheet 3
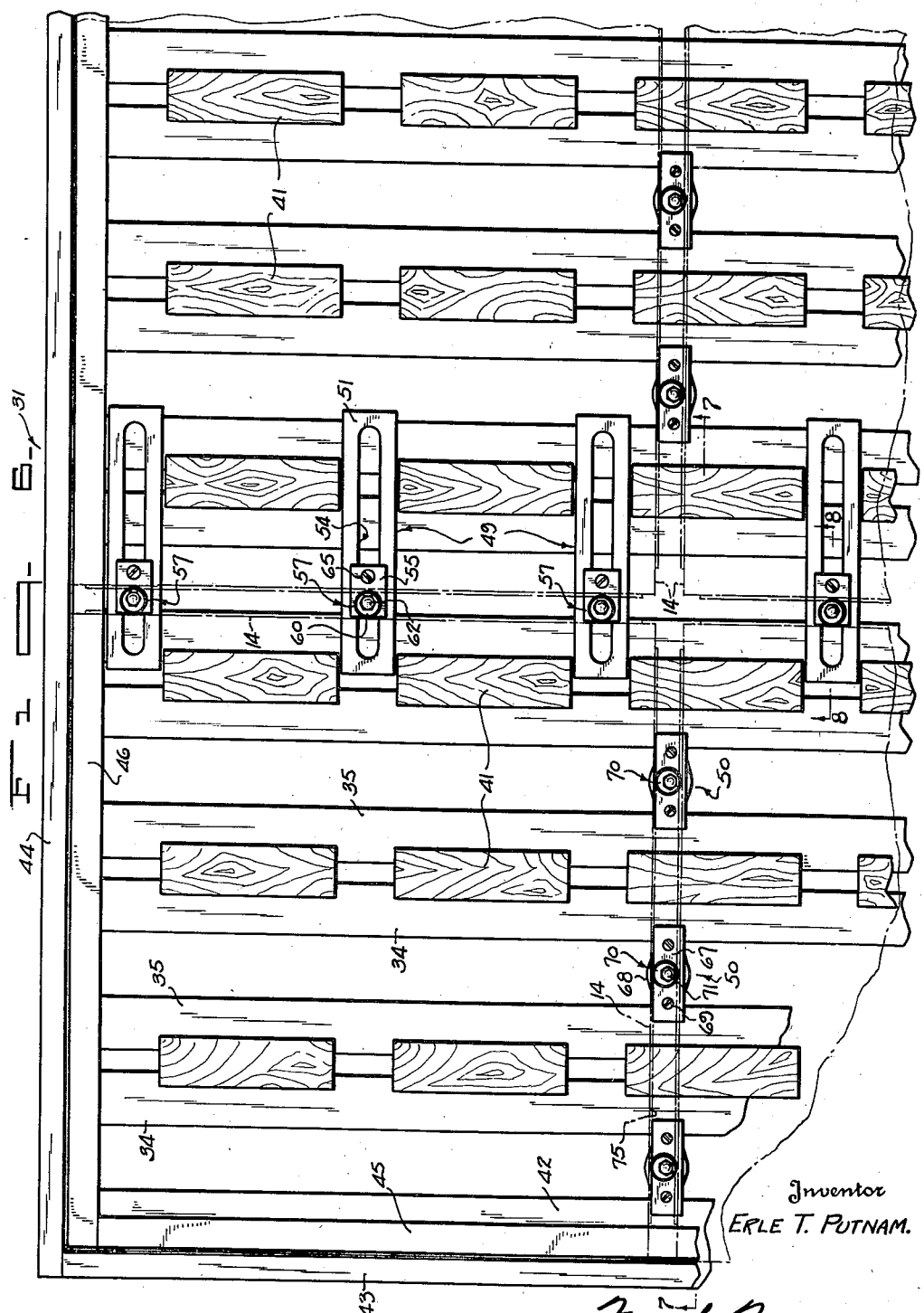
Inventor
ERLE T. PUTNAM.
By Frank Fraser
Attorney

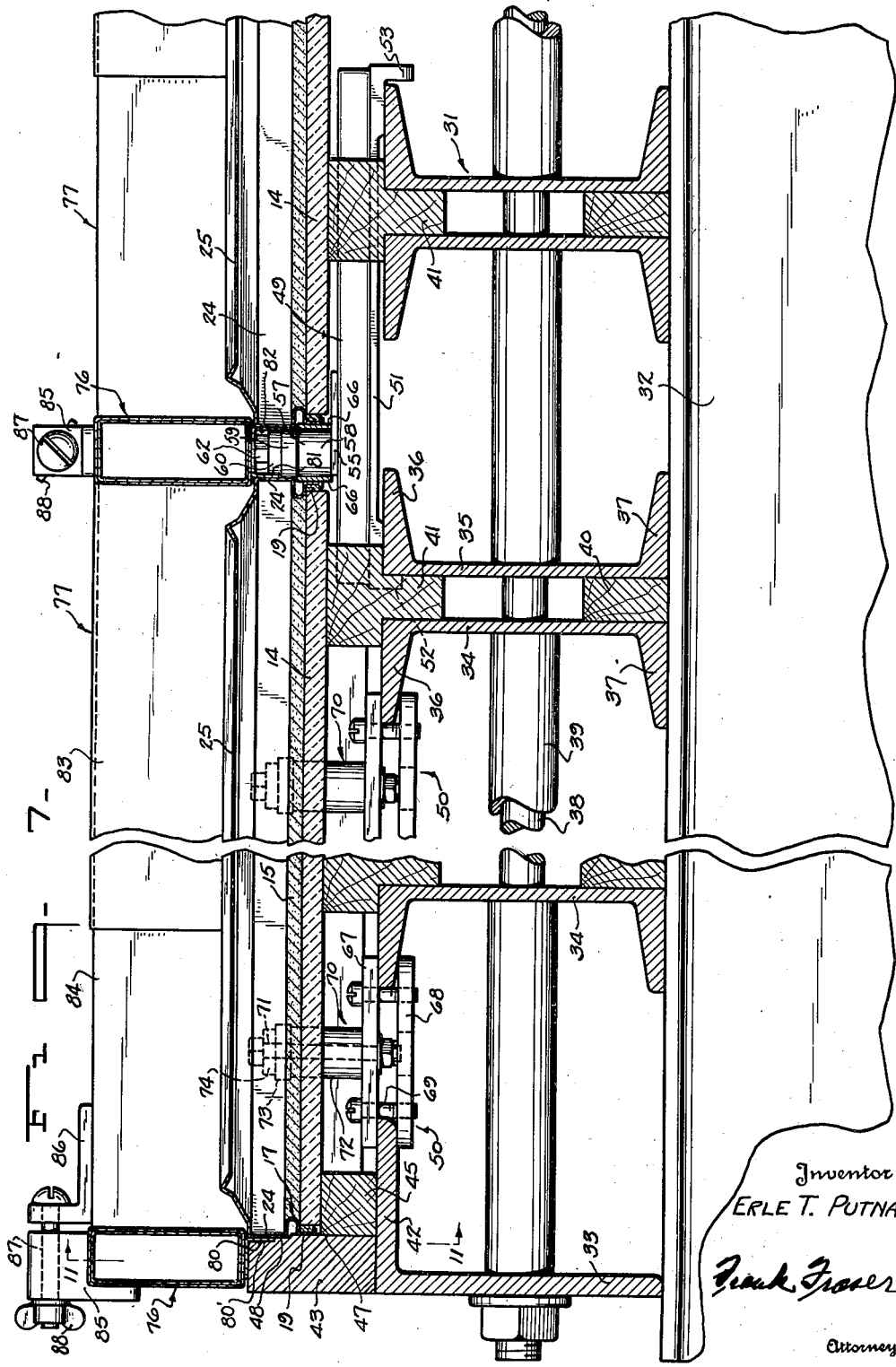

Jan. 20, 1942.  E. T. PUTNAM  2,270,556
APPARATUS FOR USE IN THE MANUFACTURE OF BUILDING BLOCKS
Original Filed June 11, 1937    6 Sheets-Sheet 5
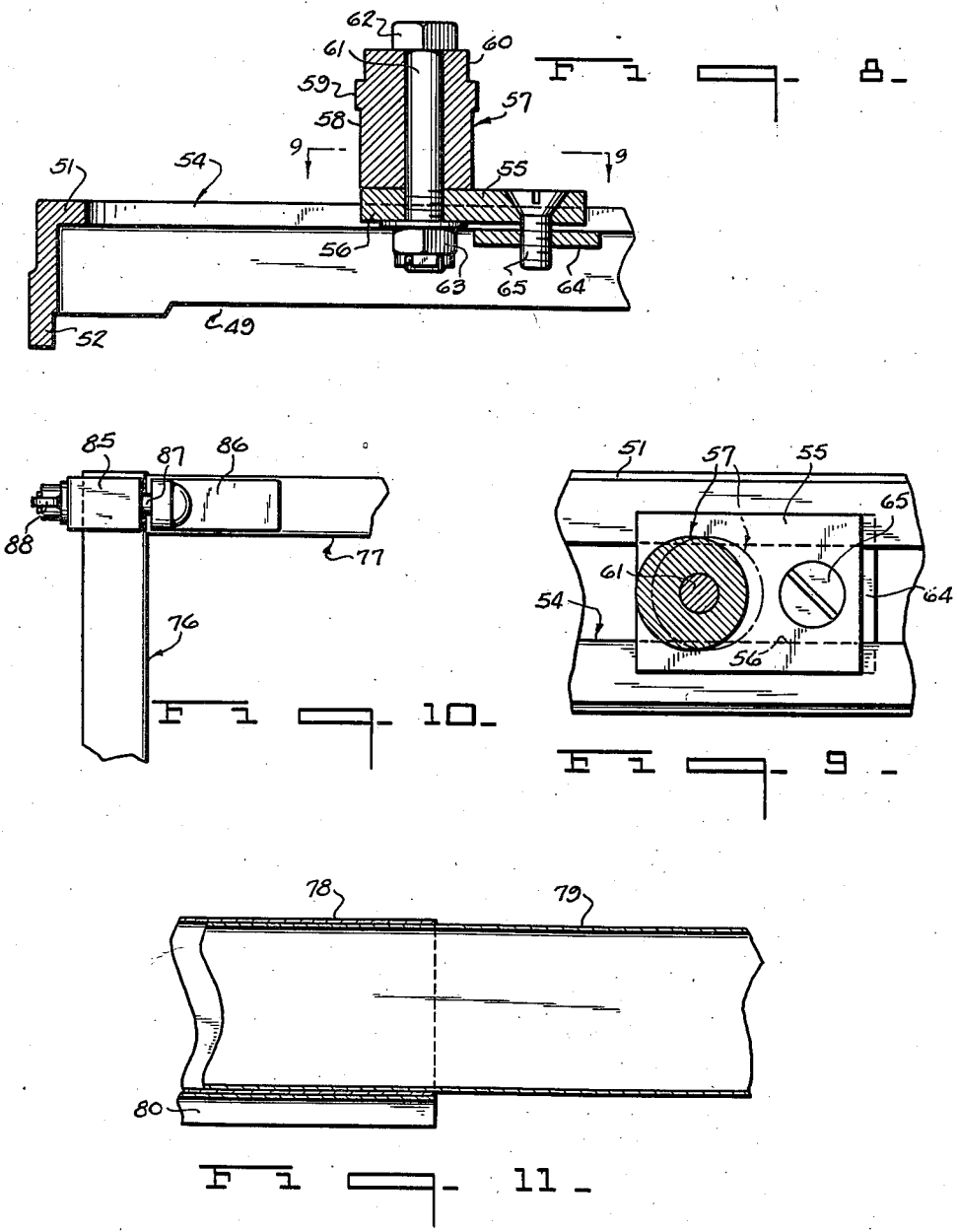
Inventor
ERLE T. PUTNAM.
By Frank Fraser
Attorney Jan. 20, 1942. E. T. PUTNAM 2,270,556
APPARATUS FOR USE IN THE MANUFACTURE OF BUILDING BLOCKS
Original Filed June 11, 1937 6 Sheets-Sheet 6

Inventor
ERLE T. PUTNAM.

By Frank Fraser
Attorney

Patented Jan. 20, 1942

2,270,556

UNITED STATES PATENT OFFICE 2,270,556

APPARATUS FOR USE IN THE MANUFACTURE OF BUILDING BLOCKS

Erle T. Putnam, Detroit, Mich., assignor to Libbey-Owens-Ford Glass Company, Toledo, Ohio, a corporation of Ohio Original application June 11, 1937, Serial No. 147,691. Divided and this application September 24, 1940, Serial No. 358,150

12 Claims. (Cl. 25—121)

The present invention relates to apparatus for use in the manufacture of building units adapted for use in the construction of the exterior walls of buildings, and constitutes a division of my co-pending application filed June 11, 1937, Serial No. 147,691, entitled "Building unit."

The building unit disclosed and claimed in the above application consists briefly of a composite block comprising a body portion formed from a plastic material such as concrete or the like, and an ornamental facing therefor consisting preferably of a sheet or plate of opaque glass, although ceramic tile may be used in some instances if desired. The ornamental face plate is firmly secured to the body portion by an interposed layer of adhesive material such as asphaltic mastic cement and also by mechanical fastening means in the form of metal frame members having portions engaging the edges of the ornamental face plate and other portions embedded in the body portion.

It is the aim of this invention to provide novel and improved apparatus by the use of which building blocks of the above character, having definite uniform dimensions, may be efficiently, accurately, and economically produced on a commercial basis.

Other objects and advantages of the invention will become more apparent during the course of the following description when taken in connection with the accompanying drawings.

In the drawings, wherein like numerals are employed to designate like parts throughout the same:

Fig. 6 is a plan view of the apparatus designed for use in the manufacture of the form of block shown in Fig. 4;

Fig. 7 is a longitudinal vertical sectional view through the apparatus taken substantially on line 7—7 of Fig. 6;

Fig. 8 is a longitudinal sectional view of one of the clamping members taken substantially on line 8—8 of Fig. 6;

Fig. 9 is a detail sectional view taken substantially on line 9—9 of Fig. 8;

Fig. 10 is a detail plan view showing the manner in which the mold members may be secured together;

Fig. 11 is a sectional view of the mold members taken substantially on line 11—11 of Fig. 7.

Figure 1:
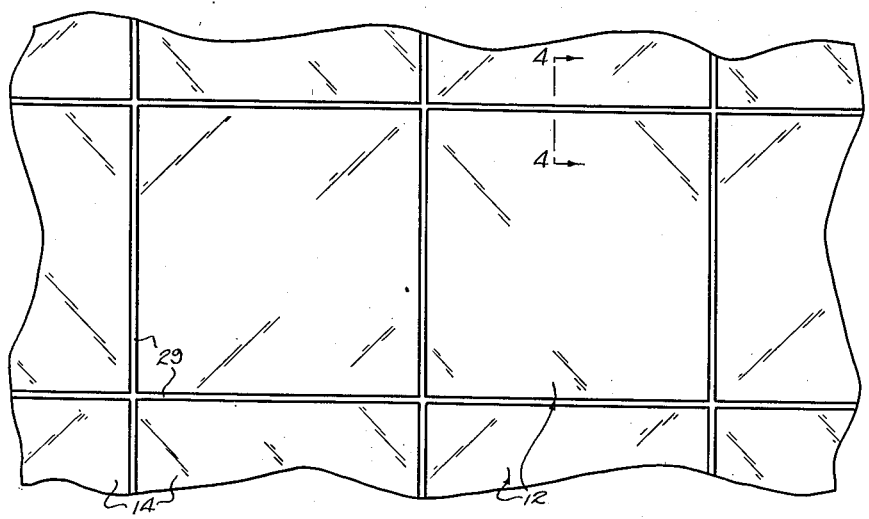
Fig. 1 is a front elevation of a portion of a wall formed of building blocks constructed in accordance with the invention.
Figure 2:
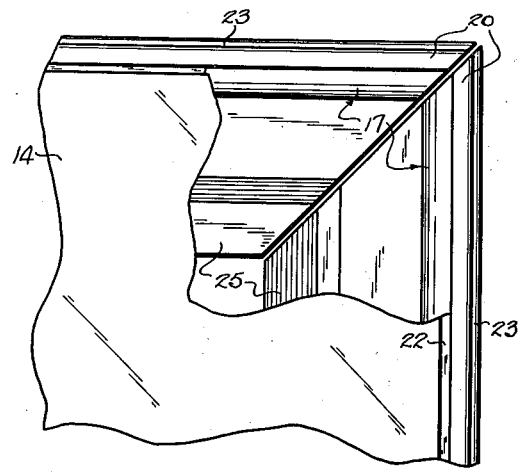
Fig. 2 is a front view of one of the glass or other ornamental face plates and the metal frame members associated therewith, the face plate being partially broken away to more clearly show the frame members.

With reference now to the drawings and particularly to Figs. 1 to 4, there is disclosed one form of building block provided by the invention. The building blocks may be of any desired contour but, as shown in Fig. 1, the said blocks, designated in their entirety by the numeral 12, are rectangular, and this is of course the most conventional shape, although they may obviously be of any particular shape or shapes desired. Each building block 12 is of a composite construction comprising a body portion 13 formed of a plastic material such as concrete or the like, and an ornamental facing 14 preferably consisting of a sheet or plate of opaque glass, although ceramic tile or face plates of other materials may be used in some cases. Therefore, while the face plate will be hereinafter referred to as being of glass, it will be understood that a face plate of any desired satisfactory material may be employed without departing from the invention.

The glass face plate 14 covers substantially the entire front surface of the concrete body portion 13 and interposed between the said facing and body portion is a relatively thick, substantially uniform layer of adhesive material 15 preferably an asphaltic mastic cement which serves not only to bind the facing to the body portion, but also permits relative expansion and contraction between the two without danger of the face plate becoming broken or accidentally displaced. The layer of adhesive material 15 also serves to cushion the face plate against shock and blows, thereby increasing its resistance to breakage.

Figure 3:
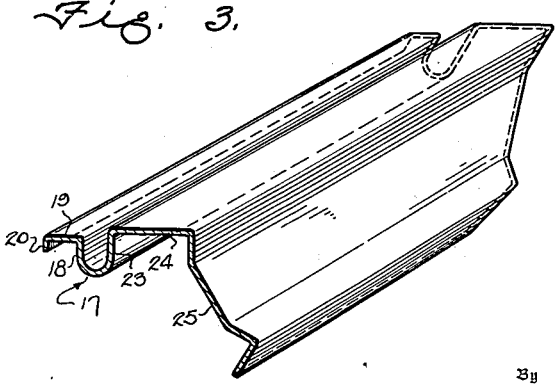
Fig. 3 is a perspective view of one of the metal frame members.
Figure 4:
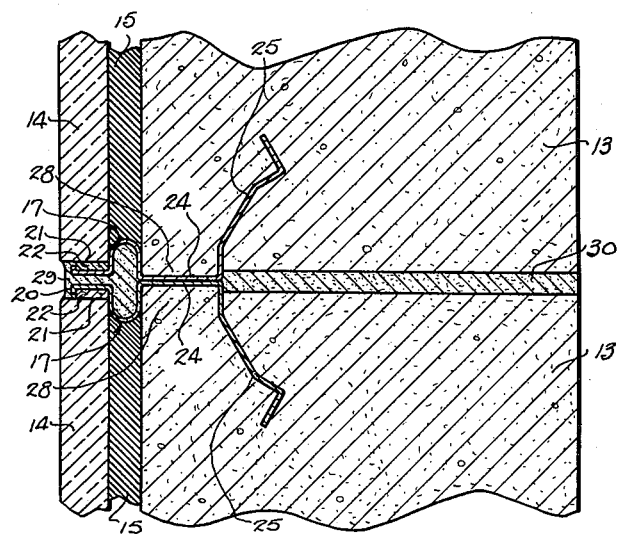
Fig. 4 is a vertical sectional view through a portion of the wall taken substantially on line 4—4 of Fig. 1.

Arranged at each edge of the face plate 14 is a metal holder of the construction shown in Fig. 3, and these holders cooperate to form a frame extending entirely around the perimeter of the block for mechanically securing the said face plate to the body portion. Each of these holders or frame members comprises a longitudinally extending channel shaped portion 17 which, as best shown in Fig. 4, is received between the face plate 14 and body portion 13 of the block. The outer wall 18 of the channeled portion 17 constitutes a shoulder which abuts the rear surface of the face plate, and extending forwardly therefrom and at substantially right angles thereto is a flange 19 disposed opposite the respective edge of the face plate and terminating in an inwardly directed lip 20.

The edges 21 of the face plate 14 are square with the opposite surfaces of said face plate and secured thereto is a strip 22 of some suitable resilient material, preferably an asphalt impregnated cork strip, although it may be of rubber, rubber composition, etc. These strips serve to protect the edges of the face plate and act as a cushion to prevent chipping or spalling of said face plate during the setting of the block in place in the wall. For instance, it has been found that when setting blocks of this character, it is often necessary to place a tool between adjacent blocks and use it as a wedge to move the blocks into the exact desired position. Due to the provision of the strips 22, this moving or shifting of the blocks to the desired position can be effected without danger of chipping or spalling the edges of the face plates. It will be noted, upon reference to Fig. 4, that the cork strip 22 terminates inwardly of the outer surface of the face plate and that the shoulder 18, flange 19, and lip 20 of the metal frame member define a substantially U-shaped channel in which the said strip 22 is received. This strip is preferably firmly secured to the edge of the face plate by a suitable adhesive and is relatively thicker than the width of the lip 20 so that while the lip extends over or overlaps the forward edge of the strip, it does not contact with the edge of the face plate.

The inner wall 23 of the channeled portion 17 constitutes a shoulder which engages the outer surface of the body portion 13, said shoulder projecting slightly beyond the outer shoulder 18, and extending at right angles with respect thereto is a relatively wide, flat, load bearing surface 24 which is disposed opposite the body portion of the block. Formed integral with and constituting a continuation of the load bearing surface 24 is an inwardly directed flange 25 having a plurality of angular portions which are embedded and effectively tie into the concrete body portion 13.

In the manufacture of the block 12, the glass face plate 14 is first laid horizontally on a support and one of the metal frame members positioned at each side of the face plate so that the outer shoulder 18 of the channeled portion 17 rests upon the rear surface of the face plate while the lip 20 fits around the cushioning strip 22. Clamping means are provided for holding the metal frame members in proper position and the flanges 19 thereof in firm, snug engagement with the strips 22. The mastic or other adhesive material 15, in a semi-liquid state, is then poured upon the back of the face plate to cover substantially the entire surface thereof and to form a layer of a thickness approximately equal to the depth of the channeled portion 17. The cement or other plastic material forming the body portion 13 is then deposited on top of the layer of mastic to cover the same and to completely fill the space defined by the metal frame members. A mold is also built up around the frame members to permit the molded body portion 13 to be made considerably thicker than the width of the said frame members, as shown in Fig. 4, and when this is done it will be seen that the flanges 25 of the frame members will be embedded in the body portion. After the body portion has set, the mold and clamping means are removed and the block is ready for use. While it is preferred to use cement for the body portion, the said body portion may be made of any suitable material or mixture of materials.

In constructing the wall shown in Fig. 1, the blocks 12 are laid up in courses in much the same manner as cut stone, granite, or terra cotta, and may or may not be mechanically anchored to a rear or foundation wall, as desired. Due to the fact that the load bearing surfaces 24 of the metal frame members project beyond the edges of the face plate 14, there will be formed around the edges of the body portion 13 a continuous ledge 28 which also projects slightly beyond the edges of the said face plate. As a result, when the blocks are laid up in courses in a wall, the load bearing surfaces 24 of vertically adjacent blocks will engage one another while the edges of the adjacent face plates will be spaced slightly from each other, and in this space is adapted to be inserted a suitable caulking or pointing material 29. This caulking material may be applied by means of a spray gun and will ordinarily fill the mating channels 17 of adjacent frame members. With such a construction, the structural load of the wall will be supported entirely by the body portions 13 of the blocks, with none of the load being placed upon the face plates 14. In other words, the load of one block is transferred directly to the next lower block, and each block takes the full strain of the blocks above it. Since it is impossible for the vertically adjacent face plates to engage one another when the blocks are put in place, the strain upon the said face plates will be reduced to a minimum, thereby eliminating breakage and chipping thereof. While the load bearing surfaces 24 are shown in Fig. 4 as directly contacting one another, they may be slightly spaced by a relatively thin layer of mortar therebetween, and in such case the load of one block will be transferred to the next lower block directly through this layer of mortar.

The construction of the block is such that the face plate does not support any of the load when the block is set into the wall and the layer of adhesive material between the face plate and body portion takes care of any differences in expansion and contraction between the two materials, thus minimizing danger of breakage of the face plate under expansion or contraction. Also, the uniform layer of adhesive material 15 provides a cushion for the face plate to minimize the liability of breakage thereof. By the combination of mechanical fastening means and adhesive material, the face plate is firmly secured to the body portion with practically no danger whatever of its becoming accidentally displaced.

When the blocks are mounted in place, the body portions 13 of vertically adjacent blocks will also be spaced from one another inwardly of the load bearing surfaces 24 and this space can be filled with a layer of mortar 30. As the lips 20 of the metal frame members are disposed slightly inwardly of the outer surface of the glass face plate, the caulking material 29 will conceal the said lips and give the appearance of a wall built up of only the glass face plates, as these plates will be the only parts of the blocks exposed to view. This will result in a wall of exceptionally pleasing and attractive appearance. The caulking material 29 is also adapted to be inserted in the vertical joints between horizontally adjacent blocks.

Figure 5:
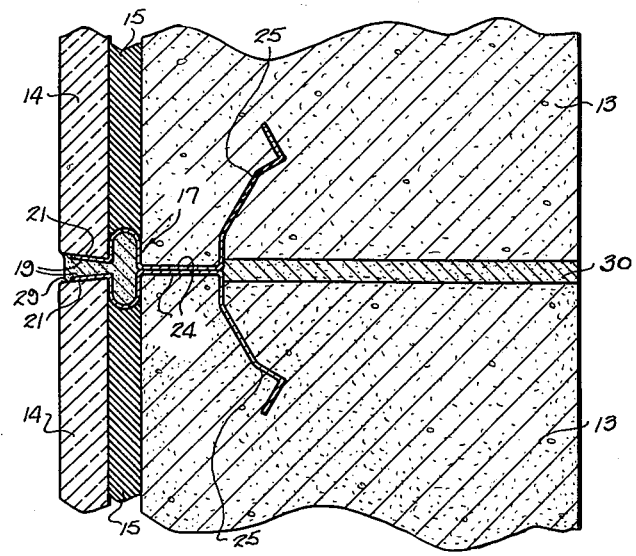
Fig. 5 is a view similar to Fig. 4 but showing a modified form of block.

In Fig. 5 is disclosed a modified form of block in which the cushioining strips 22 are eliminated as are also the lips 20 on the metal frame members. In lieu thereof, the edges 21 of the face plates are outwardly beveled while the flanges 19 of the metal frame members are arranged at an acute angle with respect to the shoulders 18 so as to snugly fit over said beveled edges, thereby firmly tying the face plate to the body portion. Otherwise, the construction of the block is the same as illustrated in Figs. 1 to 4.

Figure 12:
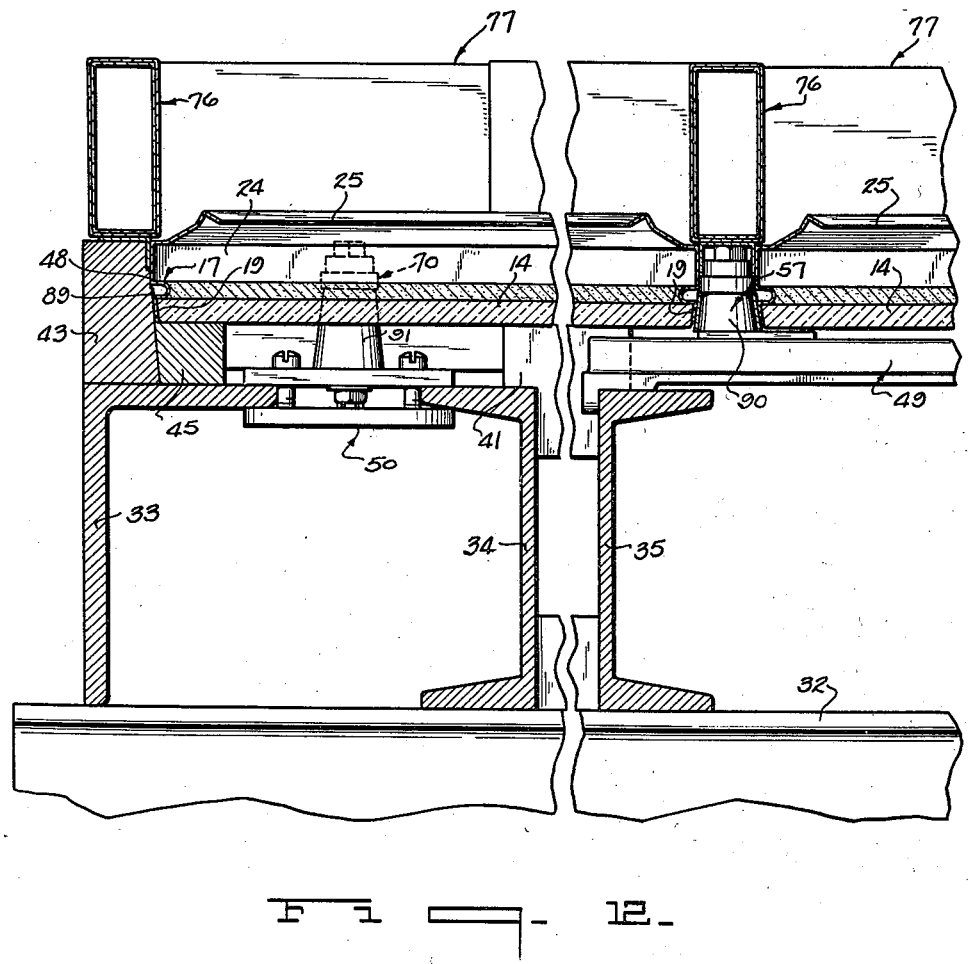
Fig. 12 is a sectional view somewhat similar to Fig. 7 but showing the apparatus slightly modified to adapt it for use in manufacturing the form of block illustrated in Fig. 5.

In Figs. 6 to 11 is disclosed a preferred form of apparatus which is adapted to be used in the manufacture of the type of block shown in Fig. 4, while in Fig. 12 is shown how the apparatus can be modified to adapt it for use in manufacturing the form of block illustrated in Fig. 5.

With reference first to Figs. 6 to 11, the apparatus comprises a rectangular table, designated in its entirety by the numeral 31, and upon which a plurality of blocks may be simultaneously produced. This table, which may be of any desired size, is built up of a plurality of spaced transverse supporting members 32 and carried upon said members, along each side of the table, is a longitudinally extending angle beam 33, while a similar transverse beam is provided at each end of said table.

Extending longitudinally of the table between the angle beams 33 and mounted upon the transverse supporting members 32 are a plurality of pairs of channel beams 34 and 35, said beams being supported on edge and the upper and lower flanges 36 and 37 of each pair extending in opposite directions. The channel beams 34 and 35 and the angle beams 33 at opposite sides of the table are tied together at a plurality of points longitudinally of said table by tie rods 38 passing transversely therethrough, with the pairs of channel beams being maintained in properly spaced relation by sleeves 39 encircling said tie rods. The channel beams 34 and 35 of each pair are maintained spaced from one another by wooden blocks 40 positioned therebetween and supported on the transverse members 32, while supported upon the upper ends of the channel beams are wooden T-shaped blocks 41, the vertical portions of which are received between said channel beams.

Mounted upon the upper horizontal flange 42 of the angle beam 33 at one side of the table and extending longitudinally thereof is a metal clamping board 43, and a similar clamping board 44 is arranged transversely at one end of the table. Also carried upon the angle beam 33, inwardly of the clamping board 43, is a wooden supporting strip 45, with a similar strip 46 being carried at the end of the table inwardly of the clamping board 44. The upper surfaces of the wooden blocks 41 are wooden strips 45 and 46 are in horizontal alignment with one another and cooperate to form a horizontal support for the face plates 14 of the blocks being produced.

In practice, a plurality of blocks 12 are adapted to be simultaneously produced upon the table 31 and to this end a plurality of glass face plates 14 are laid thereupon in spaced edge to edge relation both transversely and longitudinally of said table and the metal frame members properly associated therewith in the manner above described and firmly clamped in such position preliminary to the pouring of the layer of adhesive material 15 and body portion 13.

For example, when arranging the face plates 14 upon the table, the first face plate is adapted to be positioned in the upper left hand corner of the table (Fig. 6) and the metal frame members properly associated therewith and clamped in position. One of the frame members will be clamped between the clamping board 43 at the side of the table and the respective edge of the face plate, while another frame member will be clamped between the clamping board 44 at the end of the table and the respective edge of said face plate. As shown in Fig. 7, the flanges 19 of the frame members will be clamped against the inner surfaces 47 of the clamping boards 43 and 44 while the upper portion of the inner surface of each clamping board is notched or cut back as at 48 to accommodate the load bearing surface 24 of the respective frame member which extends slightly outwardly beyond the flange 19 as above described. In other words, the inner surfaces of the clamping boards 43 and 44 are shaped to correspond to and exert a clamping action on the flanges 19 and load bearing surfaces 24 of the metal frame members.

Arranged at the edge of the face plate opposite the clamping board 43 and adapted to secure the third metal frame member in position are a plurality of eccentric clamping members 49 carried by the table, while arranged at the edge of the face plate opposite the clamping board 44 for clamping the fourth metal frame member in place are a plurality of eccentric clamping members 50 also carried by said table.

Each of the clamping members 49 comprises an elongated base 51 arranged transversely of and supported upon the upper ends of the channel beams 34 and 35, said base being provided at its opposite ends with depending flanges 52 and 53 (Fig. 7) which fit over the said channel beams. The base 51 of each clamping member is provided with an elongated slot 54 and slidably supported upon said base is a plate 55 having a thickened portion 56 which is received within said slot and prevents lateral movement of said plate with respect to the base. Rotatably carried by the plate 55 is a cylindrical clamping element 57 comprising a body portion 58 at the upper end of which is formed a collar 59 of slightly larger diameter while the extreme upper end portion 60 of said clamping element is of a diameter slightly less than the diameter of the body portion 58. The clamping element 57 is eccentrically mounted upon a vertical bolt or the like 61 extending vertically therethrough and provided at its upper end with an angular head 62 which may be engaged by a wrench or other tool to facilitate the turning of the clamping element. The bolt projects at its lower end loosely through the plate 55 and has threaded thereon a nut 63.

From the above, it will be seen that the clamping element 57 is slidably adjustable along the base 51 and in order to secure the said element in properly adjusted position, a second plate 64 is provided beneath the base and passing through the said plates 55 and 64 is a tightening screw 65, said plate 64 engaging the under-surface of the base 51 at opposite sides of the slot 64 when the said screw is tightened. After the face plate 14 has been properly positioned relative to the clamping boards 43 and 44 and metal frame members properly associated with the respective edges of the face plate, the clamping members 49 are fitted over the proper channel beams 34 and 35 and the eccentric clamping elements 57 moved forwardly until the collars 59 thereof engage the load bearing surface 24 of the metal frame member, the said clamping elements being then secured in place by tightening the screws 65. When the clamping elements initially engage the metal frame member, they are in retracted position as indicated by the broken lines in Fig. 11, and after being secured to the base, are rotated to the position indicated by the full lines so as to frictionally engage and firmly clamp the frame member to the edge of the face plate.

As shown in Fig. 7, the collars 59 of the clamping elements will engage the load bearing surface 24 of the metal frame while the body portions 58 of said clamping elements will be disposed oppositely but spaced slightly from the flange 19 of the metal frame member. Positioned between the body portions 58 and the flange 19 and adapted to receive the clamping pressure of said clamping elements and transmit it to said flange 19 is a metal strip 66 which extends substantially the entire length of the metal frame member. It has been found that if the metal strip 66 is not used and the body portions of the clamping elements made to directly engage the flange 19 upon rotation of the said clamping elements to clamping position, there is a tendency for the metal frame member to be slid longitudinally of the sheet edge. However, by interposing the metal strip 66 between the clamping elements and metal frame member, any tendency to slide will be on the part of the metal strip and not by the metal frame member. While the use of the metal strip 66 is preferred, it will of course be appreciated that it can be omitted if desired and the body portions of the clamping elements made to engage the flange 19 of the metal frame.

The clamping members 50 are of substantially the same construction as the clamping members 49 and, as shown in Fig. 9, include a base plate 67 which rests upon and extends between the channel beams 34 and 35 or the said channel beams and angle beams 33 at the sides of the table. Positioned beneath the upper flanges of the said beams is a plate 68 and passing through the base plate 67 and plate 68 are screws 69 which secure the clamping member to the table. Carried by the base plate 67 is the rotatable cylindrical clamping element 70 eccentrically mounted upon the bolt 71 passing vertically through the said base plate 67, said clamping element including a body portion 72 provided adjacent its upper end with a collar 73 of relatively greater diameter and terminating in a reduced portion 74 of a diameter relatively smaller than said body portion. The clamping elements 70 operate in the same manner as the clamping elements 57 and when moved into clamping position, the collars 73 will contact the load bearing surface 24 of the respective metal frame member while the body portions 72 will be disposed opposite but spaced from the flange 19 of said frame member. Interposed between said body portions 72 and flange 19 is a metal strip 75 similar to strip 66.

After the first face plate 14 has been secured upon the table with the metal frame members properly associated therewith, additional face plates can be arranged both transversely and longitudinally of said table and secured in place in the same manner by using the clamping members 49 and 50 in conjunction with one another and with the clamping boards 43 and 44 as clearly illustrated in Figs. 6 and 7. If desired, the wooden supporting blocks 41 may be slidably mounted upon the channel beams 34 and 35 so that they can be moved longitudinally of the table to permit proper placement of the clamping members 49. The upper faces of the blocks 41 may also be covered with felt or some other suitable material to prevent scratching of the glass face plates when laid thereon.

After the desired number of face plates 14 and associated metal frame members have been properly clamped upon the table, a mold is mounted above the face plates in surrounding relation thereto, said mold including the longitudinally extending mold members 76 and the transverse mold members 77. One of the longitudinal mold members 76 is supported upon the clamping board 43 and is composed of hollow telescoping outer and inner sections 78 and 79 (Fig. 11), said outer sections being each provided with a vertical depending lip 80 which is received between the clamping board 43 and load bearing surface 24 of the respective metal frame member as shown in Fig. 9, the inner surface of said clamping board being cut back or notched as at 80 to accommodate said lips 81 and 82 (Fig. 7) received between the reduced upper portions 60 of said clamping elements and the metal frame members of adjacent face plates. Extending transversely of the longitudinal mold members 76 are the transverse mold members 77 which are supported upon the clamping board 44 at the end of the table and also upon the clamping elements 70 in the same manner as the longitudinal mold members. Each of the transverse mold members may also consist of outer and inner telescoping sections 83 and 84 so that they can be used in the making of different sized blocks.

The transverse mold members 77 are secured to the longitudinal mold members 76 by suitable clamping means which may be of the type illustrated in Figs. 7 and 10 and which consists of a bracket 85 carried by the longitudinal mold member 76 and an angle member 86 carried by the transverse mold member 77. Passing transversely through the bracket and angle member is a screw 87 upon the outer end of which is threaded a wing nut 88. By tightening the wing nuts, the mold members can be secured firmly together.

When the mold is properly positioned, the adhesive material 15 is flowed upon the back surfaces of the glass face plates, after which the plastic material forming the body portions 13 is poured upon the layers of adhesive. In this way, a plurality of blocks can be simultaneously produced upon the table. After the material forming the body portions has hardened, the blocks are completed and ready for use.

In Fig. 12 is shown how the apparatus by simple modification can be adapted to the manufacture of the form of block illustrated in Fig. 5, wherein the edges 21 of the glass face plates are beveled and the flanges 19 of the frame members correspondingly beveled to snugly engage the sheet edges. The apparatus used in making this form of block can be of the same construction as described above with the exception that the inner surface of each side and end clamping boards 43 and 44 below the cut back portion 48 is beveled as at 89 to correspond to and snugly engage the beveled flanges 19 of the respective metal frame members to hold them against the beveled edges of the face plate. Likewise, the body portions 90 and 91 of the clamping elements 57 and 70 are also beveled to correspond to the beveled flanges of the metal frame members. Otherwise, the apparatus is the same as that described hereinabove.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table for supporting the face plate horizontally thereon, clamping means carried by the table for securing the face plate in fixed position thereupon and for also clamping the metal frame members in proper association therewith, and a mold removably supported by said clamping means in surrounding relation to said face plate for receiving the material forming the body portion.

2. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table for supporting the face plate horizontally thereon, clamping means carried by the table for securing the face plate in fixed position thereupon and for also clamping the metal frame members in proper association therewith, and a mold supported upon the clamping means in surrounding relation to the face plate for receiving the material forming the body portion, said mold being provided with depending portions received between said clamping means and metal frame members.

3. In apparatus for use in the manufacture of that type of composite building block which includes a body portion, an ornamental face plate covering a surface of said body portion and metal frame members securing the face plate to the body portion and having portions surrounding the edges of said face plate and other portions surrounding said body portion; comprising a table for supporting the face plate horizontally thereon, clamping means carried by the table for securing the face plate in fixed position thereupon and for also clamping the metal frame members in proper association therewith, said clamping means having portions shaped to correspond to and exert a clamping action on the above-mentioned portions of the frame members, and a mold arranged above the face plate in surrounding relation thereto for receiving the material forming the body portion.

4. In apparatus for use in the manufacture of that type of composite building block which includes a body portion, an ornamental face plate covering a surface of said body portion and metal frame members securing the face plate to the body portion and having portions surrounding the edges of said face plate and other portions surrounding said body portion; comprising a table for supporting the face plate horizontally thereon, clamping means carried by the table for securing the face plate in fixed position thereupon and for also clamping the metal frame members in proper association therewith, said clamping means having portions shaped to correspond to and exert a clamping action on the above-mentioned portions of the frame members, and a mold supported upon the clamping means in surrounding relation to the face plate for receiving the material forming the body portion, said mold being provided with depending portions received between said clamping means and metal frame members.

5. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table for supporting the face plate horizontally thereon, eccentric clamping means carried by the table for securing the face plate in fixed position thereupon and for also clamping the metal frame members in proper association therewith, and a mold arranged above the face plate in surrounding relation thereto for receiving the material forming the body portion.

6. In apparatus for use in the manufacture of that type of composite building block which includes a body portion, an ornamental face plate covering a surface of said body portion and metal frame members securing the face plate to the body portion and having portions surrounding the edges of said face plate and other portions surrounding said body portion; comprising a table for supporting the face plate horizontally thereon, eccentric clamping means carried by the table for securing the face plate in fixed position thereupon and for also clamping the metal frame members in proper association therewith, said clamping means having portions shaped to correspond to and exert a clamping action on the above-mentioned portions of the frame members, and a mold arranged above the face plate in surrounding relation thereto for receiving the material forming the body portion.

7. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table having means for supporting the face plate horizontally thereon and a clamping board extending along one side and end of said table adapted to engage two edges of the face plate and projecting above said supporting means, clamping members carried by the table adapted to engage the other two edges of said face plate and cooperating with said clamping boards for securing the face plate in fixed position upon said table and for also clamping the metal frame members in proper association therewith, and a mold arranged above said clamping boards and clamping members in surrounding relation to said face plate for receiving the material forming the body portion.

8. In apparatus for use in the manufacture of that type of composite building block which includes a body portion, an ornamental face plate covering a surface of said body portion and metal frame members for securing the face plate to the body portion and having portions surrounding the edges of said face plate and other portions surrounding said body portion; comprising a table having means for supporting the face plate horizontally thereon and a clamping board extending along one side and end of said table and projecting above said supporting means, clamping members carried by the table and cooperating with said clamping boards for securing the face plate in fixed position upon said table and for also clamping the metal frame members in proper association therewith, said clamping boards and clamping members having portions shaped to correspond to and exert a clamping action on the above-mentioned portions of the frame members, and a mold supported upon the clamping boards and clamping members in surrounding relation to the face plate for receiving the material forming the body portion.

9. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table for supporting the face plate horizontally thereon, clamping members carried by said table and movable longitudinally thereof for engaging certain edges of said face plate, additional clamping members also carried by said table and movable transversely thereof for engaging other edges of said face plate, said first and second mentioned clamping members cooperating with one another to secure the said face plate in fixed position upon said table and for also clamping the metal frame members in proper association therewith, and a mold arranged above the said first and second mentioned clamping members in surrounding relation to said face plate for receiving the material forming the body portion.

10. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table for supporting the face plate horizontally thereon, clamping members carried by said table and movable longitudinally thereof for engaging certain edges of said face plate, additional clamping members also carried by said table and movable transversely thereof for engaging other edges of said face plate, said first and second mentioned clamping members cooperating with one another to secure the said face plate in fixed position upon said table and for also clamping the metal frame members in proper association therewith, and a mold supported upon the said first and second mentioned clamping members in surrounding relation to said face plate for receiving the material forming the body portion, said mold being provided with depending portions received between the respective clamping members and metal frame members.

11. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table for supporting the face plate horizontally thereon, clamping means carried by said table including rotatable clamping elements for securing said face plate in fixed position upon said table and for also clamping the metal frame members in proper association therewith, and a mold arranged above said clamping means in surrounding relation to said face plate for receiving the material forming the body portion.

12. In apparatus for use in the manufacture of that type of composite building block which includes a body portion, an ornamental face plate covering a surface of said body portion and metal frame members surrounding the edges of the face plate and engaging the body portion for securing the face plate to the body portion; comprising a table for supporting the face plate horizontally thereon, clamping means carried by said table including rotatable clamping elements for securing said face plate in fixed position upon said table and for also clamping the metal frame members in proper association therewith, and a mold supported upon said clamping means in surrounding relation to said face plate for receiving the material forming the body portion, said mold being provided with depending portions received between said rotatable clamping elements and metal frame members.

ERLE T. PUTNAM.